Patented Dec. 27, 1949

2,492,580

UNITED STATES PATENT OFFICE 2,492,580

METHOD OF PREPARING ENZYME REAGENT

Floyd L. Kauffman, Chicago, and Walter M. Urbain, Western Springs, Ill., assignors to Swift & Company, Chicago, Ill., a corporation of Illinois No Drawing. Application August 8, 1945, Serial No. 609,718

5 Claims. (Cl. 195—66)

This invention relates to the preparation of soluble proteolytic enzyme reagents, and it has to do more particularly with the drying of enzyme solutions.

An object of the invention is the provision of a process to yield a stable enzyme reagent.

A further object is the provision of an enzyme reagent in more convenient form to use.

Still further objects and advantages will appear from the description of the invention hereinafter given.

Enzymes are generally complex protein substances contained in certain plant and animal tissues. They are catalysts employed by a living organism to speed up the chemical reactions necessary to the maintenance of life. These catalysts can be isolated from their natural environment and put to use in reactions occurring outside of the living organism, their classification depending on the type of chemical reaction upon which they act. Thus, the proteolytic enzymes, or the proteinases, are those that digest proteins, and are useful in the tenderizing of meat, in medicine, and in industry. The protein-digesting enzymes forming the subject matter of this invention are obtained from both the animal and plant kingdoms.

The crude solid form of enzymes contain a considerable quantity of insoluble matter, some of which is foreign to the natural combination in which the enzyme is found. The insoluble substances, natural and foreign, to the enzyme are undesirable not only because their presence makes the use of the enzyme reagent unsatisfactory for certain purposes, such as the use thereof in the refractometric method for the determination of egg solids, but also because they reduce the activity of the enzyme. Hence, in order to obtain the maximum effect through the use of the proteolytic enzymes, it is desirable to obtain them in as pure a form as possible, and in a convenient form to use.

Heretofore, in order to prepare an effective proteolytic enzyme reagent from vegetable sources, the procedure has been to dissolve the crude proteinase in water, filter and then concentrate. The enzyme may be recovered from the concentrate by means of a non-solvent, such as acetone, which dissolves the oily volatile elements, but precipitates the insoluble proteinase.

Broadly, the present invention contemplates forming the enzyme solution into a foam and subsequently drying the foam at a temperature below that at which the enzyme coagulates. The dried pure product may then be stored and reconstituted as use might dictate. In solution the enzyme deteriorates rapidly and irreparably unless the solution is frozen, while in the dried state the enzyme keeps indefinitely. To increase the enzyme activity, a reducing agent, such as sodium hydrosulfite or cysteine, in small amounts, may be added to the reconstituted enzyme, and the pH adjusted if need be to that for maximum enzyme activity, as indicated in standard reference works of enzyme chemistry.

Before evaporating the enzyme solution to a consistency suitable for whipping, it is often desirable to filter the enzyme solution in order to separate the undissolved foreign matter. The pH of the filtrate is adjusted and then the filtrate is inspissated to a certain consistency, after which the enzyme is whipped into a foam, and then dried.

In preparing the foam of the enzyme, it is desirable that the foam be stable, firm and smooth upon whipping; that such a foam may be obtained in a short whipping time, and, once obtained, that it will dry quickly. By controlling both the pH and concentration of the enzyme solution prior to whipping it, we have found that we may obtain a foam possessing the desired characteristics. The optimum pH values at which the enzyme will readily whip into a stable, smooth, quick-drying foam, fall within the range of about pH 1 to about pH 10. Thus, in the case of trypsin, the optimum for whipping the solution thereof into foam of the desired qualities, is around pH 1, with a range of about 1 to 9 being satisfactory. However, since the foam of the enzyme does not dry satisfactorily below a pH of 4, a practical range for whipping trypsin was found to be between about 4 and 6. In addition, the reconstituted enzyme was found to retain its original activity in digesting gelatin at a pH of about 4.8.

For pepsin the optimum pH for whipping is between about 7 and 8, with a range of about 4 to 10 producing satisfactory results. At a pH of about 4.3, which may be obtained by merely dissolving the enzyme in water, without the addition of acid or base, the reconstituted enzyme possesses its original activity.

In the case of papain, a satisfactory pH range in which to whip the enzyme solution into a foam is from about 1 to 4, a practical range being between about 3 and 4.

No correlation exists between optimum whipping pH and that pH at which the enzyme exhibits maximum activity, the latter value being obtainable from any standard reference work in enzyme chemistry. For example, in the case of trypsin the pH of maximum activity is 7 to 9. Since the desired pH range for whipping is between about 4 and 6, the maximum activity pH may be reached by the addition of a base, such as sodium hydroxide, to the solution of the foam prior to use.

The pH of maximum activity for pepsin is cited in the literature as being around 2. Since a desirable whipping range is between about 4 to 10, the acidity for maximum activity may be obtained by adding an acid, such as hydrochloric, to the reconstituted enzyme.

As hereinbefore mentioned, we have found that the concentration of the enzyme affects the whipping qualities thereof—that is, ease of whipping and stability and texture of the foam, and subsequent drying of the foam. Optimum results are obtained if the enzyme solution is inspissated to a consistency exhibiting a refractive index at 30° C. of approximately between 1.38 and 1.47, which corresponds to a Baumé reading of between 16 and 22 degrees. Solutions of greater or less density require longer whipping times.

In concentrating the enzyme solution to the desired density, evaporation by the usual methods is not possible because in general temperatures over 70° C. destroy activity of the enzyme. If the evaporation is carried too far, the result is a gum-like material which is difficult of removal from the container and which is not readily reconstituted.

In evaporating the enzyme solution to the proper consistency, it is often desirable to add a volatile defoaming agent, which is then removed during the evaporation. Approximately 0.1 percent of capryl alcohol added to the enzyme solution causes the evaporation to proceed smoothly.

After the enzyme has been whipped into a foam, the foam is placed on a screen and dried in an air drier at a temperature below the point at which the enzyme coagulates. The dried material is then easily removed from the screen, and is eminently suitable for the preparation of the enzyme reagent, or it may be stored indefinitely without deterioration of the enzyme.

In accordance with our invention, both plant and animal enzymes may be employed in the preparation of effective enzyme reagents. Among the plant enzymes may be mentioned papain, bromelin, and ficin. Examples of animal enzymes are pepsin and trypsin.

The following examples are illustrative of the mode of the operation of the invention and are not intended to be limiting on the scope thereof.

*Example I*

Sixty grams of pepsin (U. S. P. grade) were dissolved in 100 ml. of water. A pH of 7.4 was obtained by the addition of 4 ml. of approximately 5 N sodium hydroxide. The solution was evaporated under reduced pressure at temperatures of 40 to 50° C., to a concentration exhibiting a refractive index of 1.43 at 30° C. A stable, firm foam was obtained after whipping the inspissated solution for two to three minutes. The foam was then air dried at a temperature of about 45° C.

*Example II*

Ten grams of trypsin (1:250 strength) were mixed with 100 ml. of water. The addition of 2 ml. of approximately 5 N hydrochloric acid produced a pH of 3.9. The concentration of the solution to a refractive index of 1.43 at 30° C. was effected by evaporating the solution under reduced temperatures of 60 to 70° C. After whipping two to three minutes a smooth, firm foam resulted. The foam was then dried in an air drier, at a temperature of 70° C.

*Example III*

One hundred grams of crude Ceylon papain were dissolved in 250 ml. of water. Seven grams of solid oxalic acid were added and a pH of 3.4 obtained. Approximately 0.1 percent of capryl alcohol was added as a defoaming agent and the solution concentrated under reduced pressure at temperatures of between 60° to 65° C. to a density of refractive index of 1.43 at 30° C., or a Baumé of 20°. The inspissated solution was then whipped into a foam in about five minutes, and subsequently dried at a temperature between 60 to 65° C. in an air drier.

Obviously many modifications and variations of the invention hereinbefore set forth may be made without departing from the spirit and scope thereof, and, therefore, only such limitations should be imposed as are indicated in the appended claims.

We claim:

1. The process of preparing an enzyme reagent, which comprises, adjusting the pH of a solution consisting essentially of the enzyme to within a range of about 1 to about 10, inspissating the solution under reduced pressure to a density of refractive index of 1.38 to 1.47 at 30° C., whipping the enzyme into a foam and then drying the foam, said inspissating and drying steps being performed at temperatures below the heat-coagulable point of the enzyme.

2. The process of preparing a pepsin reagent which comprises adjusting the pH of a solution consisting essentially of pepsin to within a range of about pH 7.0 to about pH 8.0, inspissating the pepsin solution under reduced pressure to a density of refractive index of 1.43 at 30° C., whipping the enzyme into a foam and then drying the foam, said inspissating and drying steps being performed at temperatures below the heat-coagulable point of the enzyme.

3. The process as in claim 1 wherein the enzyme is trypsin, the pH of whose solution is adjusted to within a range of about pH 4 to about pH 6.

4. The process as in claim 1 wherein the enzyme is papain, the pH of whose solution is adjusted to within a range of about pH 3 to about pH 4.

5. The process of preparing an enzyme reagent, which comprises, adjusting a solution consisting essentially of the enzyme to a pH between about 1 and 10 and to a refractive index between about 1.38 and 1.47 at 30° C., whipping the adjusted solution into a foam, and then drying the foam below the heat coagulable point of the enzyme.

FLOYD L. KAUFFMAN.
WALTER M. URBAIN.

REFERENCES CITED

The following references are of record in the file of this patent:

UNITED STATES PATENTS

| Number | Name | Date |
|---|---|---|
| 1,569,396 | Rice | Jan. 12, 1926 |

OTHER REFERENCES

Waksman and Davison, Enzymes, 1926, Williams and Wilkins Co., Baltimore, pp. 126 to 128.